US009902616B2

(12) United States Patent
Kondo et al.

(10) Patent No.: US 9,902,616 B2
(45) Date of Patent: Feb. 27, 2018

(54) METHOD FOR GENERATING OZONE (71) Applicant: NGK INSULATORS, LTD., Nagoya (JP)

(72) Inventors: Yoshimasa Kondo, Nagoya (JP); Shoji Yokoi, Nagoya (JP); Tatsuya Terazawa, Kasugai (JP); Naoya Takase, Konan (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/158,997

(22) Filed: May 19, 2016

(65) Prior Publication Data

US 2016/0264419 A1 Sep. 15, 2016

Related U.S. Application Data (63) Continuation of application No. 14/600,504, filed on Jan. 20, 2015, now abandoned.

(30) Foreign Application Priority Data

Jan. 24, 2014 (JP) ................................. 2014-011117

(51) Int. Cl.
*C01B 13/11* (2006.01)
(52) U.S. Cl.
CPC ............ *C01B 13/115* (2013.01); *C01B 13/11* (2013.01); *C01B 2201/10* (2013.01);
(Continued)
(58) Field of Classification Search
CPC ... C01B 13/115; C01B 13/11; C01B 2201/10; C01B 2201/14; C01B 2201/32;
(Continued)

(56) References Cited

U.S. PATENT DOCUMENTS 5,034,198 A 7/1991 Kaiga et al.
6,322,759 B1 11/2001 Riege et al.
(Continued)

FOREIGN PATENT DOCUMENTS

JP 10-324504 A 12/1998
JP 2013-193893 A1 9/2013

OTHER PUBLICATIONS

U.S. Appl. No. 14/600,433, filed Jan. 20, 2015, Kondo, et al.
German Search Report (Application No. 10 2015 100 916.1) dated Jul. 7, 2016 (with English translation).

*Primary Examiner* — Xiuyu Tai
(74) *Attorney, Agent, or Firm* — Burr & Brown, PLLC (57) ABSTRACT

An ozone generator includes one or more electrode pairs each containing two electrodes arranged at a distance of a predetermined gap length and a power source for applying an alternating-current voltage between the two electrodes. In the ozone generator, ozone is produced when a source gas flows at least between the two electrodes and a discharge is generated between the two electrodes. The ozone generator has a discharge space formed between the two electrodes, and the ozone generator satisfies the condition of 0.5<V/f/L wherein V (m/s) represents a flow velocity of the source gas flowing through the discharge space, f (Hz) represents a frequency of the alternating-current voltage, and L (m) represents a length of the discharge space in the main flow direction of the source gas.

14 Claims, 9 Drawing Sheets

(52) U.S. Cl.
CPC ...... *C01B 2201/14* (2013.01); *C01B 2201/32* (2013.01); *C01B 2201/40* (2013.01); *C01B 2201/62* (2013.01)

(58) Field of Classification Search
CPC ............ C01B 2201/40; C01B 2201/62; C01B 2201/72; C01B 2201/64; C01B 2201/22; C01B 2201/76; C01B 2201/30; B01J 19/088; B01J 2219/0809; H05H 1/2406; H05H 2001/2418; H05H 2001/2431; H05H 7/20; H01J 37/32568; H01J 37/32541; H01J 37/32018; H01J 37/32027; A61L 2/14

See application file for complete search history.

(56) References Cited

U.S. PATENT DOCUMENTS

| | | |
|---|---|---|
| 2009/0178915 A1 | 7/2009 | Otaka et al. |
| 2012/0156106 A1 | 6/2012 | Murata et al. |
| 2015/0004070 A1 | 1/2015 | Murata et al. |
| 2015/0179411 A1* | 6/2015 | Laux ................. H01J 37/32568 423/659 |

* cited by examiner

METHOD FOR GENERATING OZONE

CROSS REFERENCE TO RELATED APPLICATIONS

This application is a continuation of U.S. application Ser. No. 14/600,504 filed Jan. 20, 2015, and claims the benefit of Japanese Patent Application No. 2014-011117 filed on Jan. 24, 2014, the entireties of which are incorporated herein by reference.

FIELD OF THE INVENTION

The present invention relates to an ozone generator for flowing a source gas between electrodes and generating a discharge between the electrodes, thereby producing ozone.

BACKGROUND OF THE INVENTION

An ozone generator is an apparatus capable of flowing an oxygen-containing gas such as air in a thermal non-equilibrium plasma to produce ozone. The thermal non-equilibrium plasma is generated utilizing a discharge provided by a discharge generating device. For example, the discharge generating device may be of a silent discharge type. In this type of device, for example, a high voltage of several to several tens kV is applied by a high-voltage alternating-current power source to a discharge gap between a high-voltage electrode and a ground electrode, to generate a discharge of an aggregate of micro-discharge columns. The oxygen-containing gas is decomposed in the discharge process to produce ozone.

Conventional structures of such ozone generators are disclosed, for example, in Japanese Laid-Open Patent Publication Nos. 10-324504, and 2013-193893.

Japanese Laid-Open Patent Publication No. 10-324504 discloses in paragraph [0002] that "A silent discharge-type ozone generator has electrodes facing each other and one or two dielectric bodies interposed between the electrodes. A high alternating-current voltage is applied to the electrodes while flowing an oxygen-containing source gas (such as a high-concentration oxygen (PSA oxygen) gas or a dehumidified air) in a gap between the electrode and the dielectric body or between the dielectric bodies, and oxygen is dissociated by a silent discharge to produce ozone. The gap has a length of about 1 mm, and the dielectric body is composed of a glass or ceramic material having a high dielectric strength".

Further, Japanese Laid-Open Patent Publication No. 10-324504 discloses in paragraph [0015] that "The ozone generator 2 includes a hard glass tube (dielectric body) 9 having an outer diameter of 18 mm and a thickness of 0.9 mm, a film electrode 10 adhered to an outer surface of the glass tube 9, and a spiral electrode (made of SUS316 and having a diameter of 0.5 mm) 11 adhered to an inner surface thereof". The Publication also discloses in paragraph [0015] that "in the ozone generator 2, a dehumidified air or a high-concentration oxygen (PSA oxygen, having the oxygen concentration of 95% or more) is supplied as a source gas from one end of the glass tube 9, a high alternating-current voltage (several to some dozen kV, 40 kHz) having the switching frequency of 0.1 to 1000 cycles per second and the load factor of 5 to 95% is applied, and then ozone air (air containing ozone) is discharged from the other end of the glass tube 9". Further, the Publication discloses in paragraph [0020] that "in a case of the flow rate of dehumidified air of 1.0 L/min". Also, the Publication discloses in paragraph [0005] that "the gap between the dielectric body and the electrode or the gap between the dielectric bodies is further narrowed (to 0.5 to 1 mm)".

Japanese Laid-Open Patent Publication No. 2013-193893 discloses in paragraph [0011] that "an ozone generator contains a cylindrical high-voltage electrode, a cylindrical low-voltage electrode arranged coaxially with the high-voltage electrode, and a dielectric body between the electrodes. A dry air is supplied as a source gas between the electrodes, and a predetermined high voltage is applied through the dielectric body between the high-voltage and low-voltage electrodes to generate a discharge, whereby ozone is produced by the discharge. The discharge gap length d is 0.3 to 0.5 mm". Further, the Publication discloses in paragraph [0018] that "In addition, a pd product, which is a product of the discharge gap length d and a gas pressure p of the raw material gas (air), is in a range of 6 to 16 kPa·cm. Further, in the present embodiment, the discharge gap length d (cm) and the gas pressure p of the raw material gas (kPa) are set to satisfy the following expression".

Japanese Laid-Open Patent Publication No. 10-324504 discloses that, in the creeping discharge type ozone generator, the alternating-current voltage having the discharge frequency of 40 kHz is applied in the cylindrical tube having the outer diameter of 18 mm and the thickness of 0.9 mm, and the dehumidified air is supplied at the flow rate of 1.0 L/min. However, the Publication does not disclose what the flow velocity of the source gas in the discharge space should be in order to reduce the decomposition of ozone.

Japanese Laid-Open Patent Publication No. 2013-193893 explains the ozone production efficiency in relation to the discharge gap length and the source gas pressure. However, the gas pressure can be arbitrarily changed depending on the tube length and the air amount.

Further, the technology disclosed in Japanese Laid-Open Patent Publication No. 2013-193893 is effective in a case of a coaxial cylindrical ozone generator in which all the supplied source gas flows through the discharge space. However, the technology is not effective in a case of an ozone generator that includes electrodes arranged at a predetermined distance, each electrode having a cylindrical ceramic dielectric body and a conductive body disposed in the ceramic dielectric body. This is because the source gas also flows through spaces other than the discharge space, so that the source gas pressure varies depending on the volume of the spaces other than the discharge space.

SUMMARY OF THE INVENTION

In view of the above problems, an object of the present invention is to provide an ozone generator in which ozone generated by discharge can be prevented from being subjected to discharge again, and the ozone can hardly be decomposed by a reaction with O atom, water molecule, and OH group, whereby the ozone production reduction can be suppressed.

[1] An ozone generator according to the present invention includes one or more electrode pairs each containing two electrodes arranged at a distance of a predetermined gap length, and a power source for applying an alternating-current voltage between the two electrodes, ozone being produced in the ozone generator when a source gas flows at least between the two electrodes and a discharge is generated between the two electrodes, wherein the ozone generator has a discharge space formed between the two electrodes, and the ozone generator satisfies the condition of $$0.5 < V/fL$$

wherein V (m/s) represents a flow velocity of the source gas flowing through the discharge space, f (Hz) represents a frequency of the alternating-current voltage, and L (m) represents a length of the discharge space in the main flow direction of the source gas.

In this case, ozone generated by discharge is hardly subjected to discharge again. Thus, ozone is not decomposed through a reaction with O atom, water molecule, and OH group, whereby the ozone production reduction can be prevented.

[2] In the present invention, the ozone generator preferably satisfies the condition of 1<V/f/L. In this case, a larger amount of ozone generated by discharge is hardly subjected to discharge again. Thus, ozone is not decomposed through a reaction with O atom, water molecule, and OH group, so that the ozone production reduction can be further prevented.

[3] In the present invention, the ozone generator preferably satisfies the condition of 50>V/f/L. In this case, the amount of the source gas that flowed through the discharge space without a production reaction is reduced, and thus the ozone production reduction can be prevented.

[4] In the present invention, the ozone generator preferably satisfies the condition of 20>V/f/L. In this case, the amount of the source gas that flowed through the discharge space without a production reaction is further reduced, and thus the ozone production reduction can be further prevented.

[5] In the present invention, the gap length preferably is 0.2 mm or more and 0.5 mm or less.

In this ozone generator, even in a high-humidity environment, water molecules and OH groups, which can negatively affect the ozone production, are mostly adsorbed to the surface of the dielectric body. Therefore, the amounts of the water molecules and the OH groups remaining around the dielectric body and in the center of the discharge space are reduced. Consequently, the ozone production inhibition can be prevented, and the ozone production amount reduction can be prevented. Furthermore, an area in which the water molecules and the OH groups remain around the dielectric body and in the center of the discharge space, can be narrowed. Thus, an area in which the ozone production is inhibited, can be narrowed, and the ozone production amount reduction can be prevented. Further, the short circuit of the discharge space due to the water molecules and the OH groups can be further avoided to thereby suppress the ozone production amount reduction.

As a result, the ozone production performance is changed only slightly even under a high humidity, and thus the ozone generator can act to stably produce ozone in a wide range of humidity environments (with an absolute humidity of 0 to 50 g/m$^3$).

[6] In the present invention, the source gas may be an atmospheric air. In this case, the source gas may be a non-dehumidified air.

[7] In the present invention, each of the two electrodes may contain a tubular dielectric body having a hollow portion, and a conductive body disposed in the hollow portion.

[8] In the present invention, the ozone generator may include a plurality of the electrode pairs arranged in parallel, in series, or in parallel and series, and the ozone generator may have a gas passage plane having a normal direction parallel to the main flow direction of the source gas, and a non-discharge space formed on the gas passage plane.

[9] In the present invention, the flow rate of the source gas flowing through the discharge space is preferably 380 L/min or less, more preferably 300 L/min or less, and further more preferably 150 L/min or less.

Owing thereto, the distribution of the source gas can be narrowed in the discharge space, the ozone molecules can be uniformly produced in the discharge space, and the source gas can be used up for the ozone production. Therefore, the ozone production reduction due to the decomposition of the ozone can be prevented, and the amount of the residual source gas that has flowed through the discharge space without the production reaction, can be reduced. Consequently, the ozone generator can exhibit a high ozone production efficiency.

In the ozone generator according to the present invention, ozone generated by discharge can be prevented from being subjected to discharge again, and the ozone can hardly be decomposed by a reaction with O atom, water molecule, and OH group, and the ozone production reduction can be suppressed. As a result, the concentration of generated ozone and the ozone production efficiency can be enhanced.

The above and other objects features and advantages of the present invention will become more apparent from the following description when taken in conjunction with the accompanying drawings in which a preferred embodiment of the present invention is shown by way of illustrative example.

DETAILED DESCRIPTION OF THE INVENTION

An embodiment of the ozone generator of the present invention will be described below with reference to FIGS. 1 to 9. In this description, a numeric range of "A to B" includes both the numeric values A and B as the lower limit and upper limit values.

Figure 1:
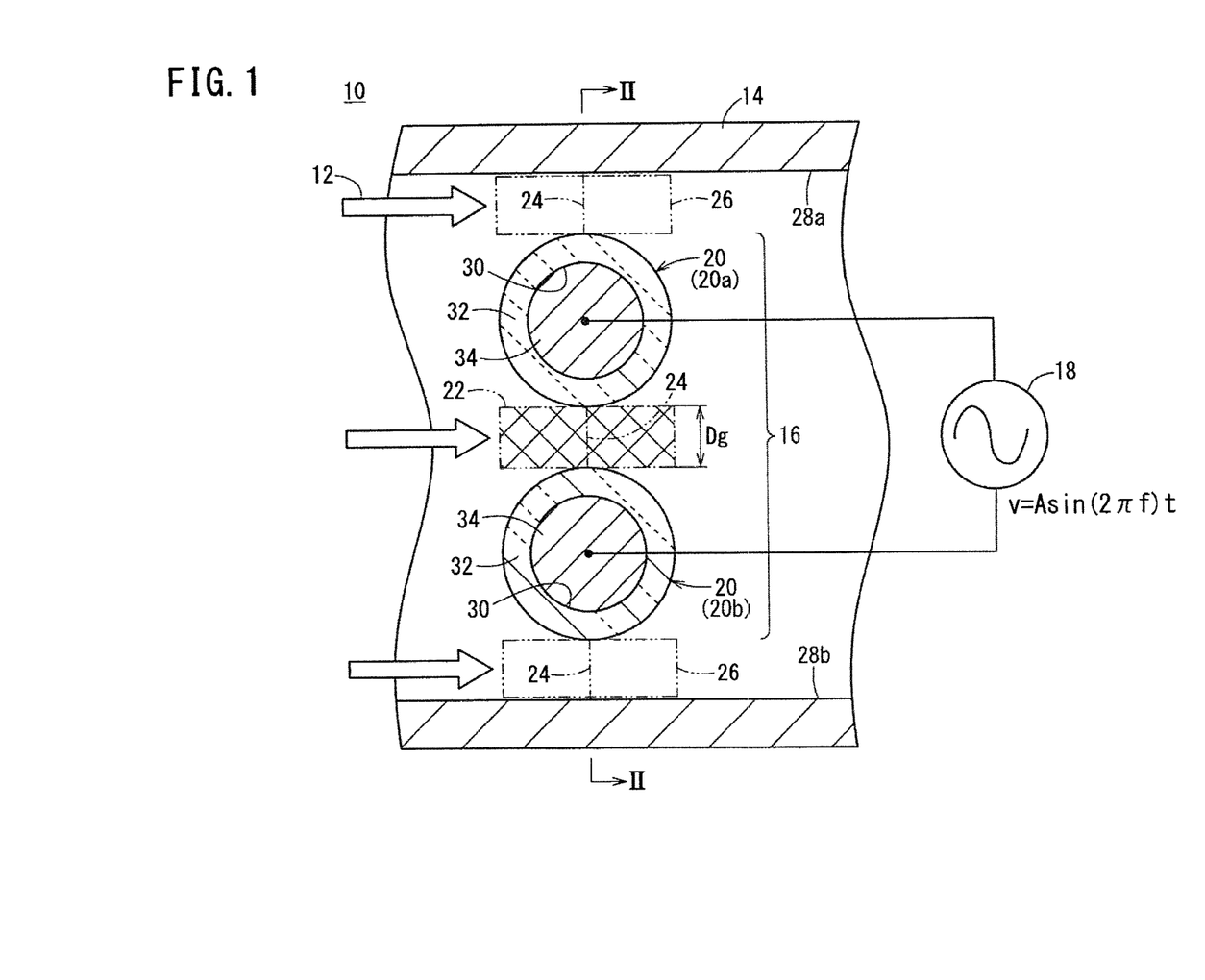
FIG. 1 is a longitudinal cross-sectional view of a principal part of an ozone generator according to an embodiment of the present invention.
Figure 2:
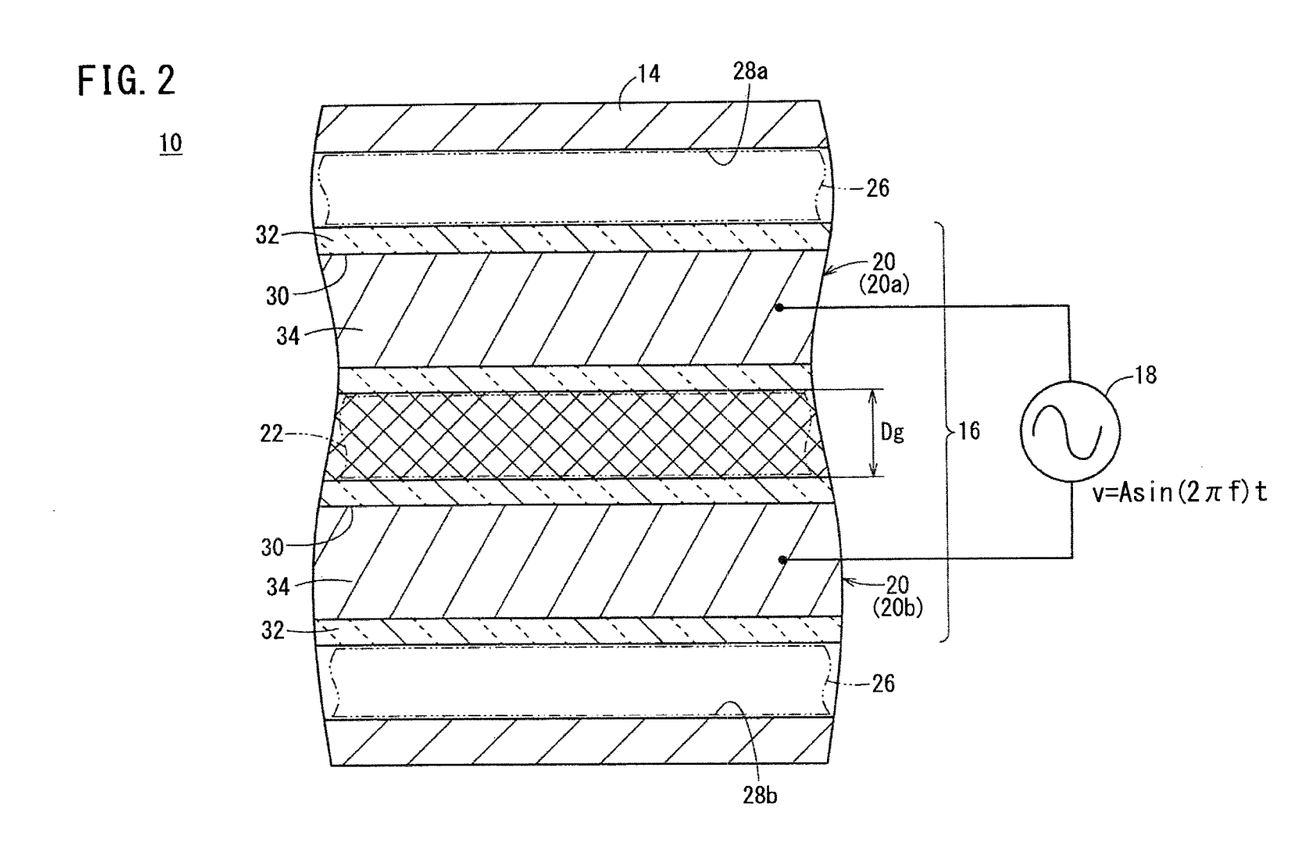
FIG. 2 is a cross-sectional view taken along the line II-II of FIG. 1.

As shown in FIGS. 1 and 2, an ozone generator 10 according to this embodiment has a housing 14 in which a source gas 12 flows, one or more electrode pairs 16 disposed in the housing 14, and an alternating-current power source 18. Each of the electrode pairs 16 contains two electrodes 20 (one electrode 20a and the other electrode 20b) arranged at a distance of a predetermined gap length Dg. The alternating-current power source 18 acts to apply an alternating-current voltage v (=A sin(2πf)t) between the two electrodes 20.

In the ozone generator 10, ozone is produced when the source gas 12 flows at least between the two electrodes 20 of the electrode pair 16 and a discharge is generated between the two electrodes 20. A space formed between the two electrodes 20, in which the discharge is generated, is defined as a discharge space 22.

The ozone generator 10 has non-discharge spaces 26 on a gas passage plane 24 having a normal direction parallel to the main flow direction of the source gas 12. Specifically, the non-discharge spaces 26 include a space between the one electrode 20a and one inner wall 28a of the housing 14 (the inner wall closer to the one electrode 20a) and a space between the other electrode 20b and the other inner wall 28b of the housing 14 (the inner wall closer to the other electrode 20b) on the gas passage plane 24. The term "the main flow direction of the source gas 12" means the flow direction of the oriented center of the source gas 12. Thus, the main flow direction excludes flow directions of non-oriented peripheral components of the source gas 12.

Each of the electrodes 20 has a rod shape, contains a tubular dielectric body 32 having a hollow portion 30, and further contains a conductive body 34 disposed in the hollow portion 30 of the dielectric body 32. In an example of FIGS. 1 and 2, the dielectric body 32 has a cylindrical shape, and the hollow portion 30 formed therein has a circular cross-section. The conductive body 34 has a circular cross-section. Of course, the shapes of the components are not limited to the example. The dielectric body 32 may have a tubular shape with a polygonal cross-section such as a triangular, quadrangular, pentangular, hexangular, or octangular section. The conductive body 34 may have a columnar shape with a polygonal section such as a triangular, quadrangular, pentangular, hexangular, or octangular section corresponding to the shape of the dielectric body 32.

In this embodiment, the source gas 12 is used for the purpose of producing ozone, and therefore may be an atmospheric air, an oxygen-containing gas, etc. In this case, the source gas 12 may be a non-dehumidified air.

The dielectric body 32 may be composed of a single-oxide, composite-oxide, or composite-nitride material containing one or more substances selected from the group consisting of barium oxide, bismuth oxide, titanium oxide, zinc oxide, neodymium oxide, titanium nitride, aluminum nitride, silicon nitride, alumina, silica, and mullite.

The conductive body 34 is preferably composed of a material containing a substance selected from the group consisting of molybdenum, tungsten, silver, copper, nickel, and alloys containing at least one thereof. Examples of such alloys include invar, kovar, inconel (registered trademark), and incoloy (registered trademark).

The dielectric body 32 is preferably composed of a ceramic material such as LTCC (Low Temperature Co-fired Ceramics), which can be fired at a temperature lower than the melting point of the conductive body 34. Specifically, the dielectric body 32 is preferably composed of a single-oxide, composite-oxide, or composite-nitride material containing one or more substances selected from the group consisting of barium oxide, bismuth oxide, titanium oxide, zinc oxide, neodymium oxide, titanium nitride, aluminum nitride, silicon nitride, alumina, silica, and mullite.

Figure 3:
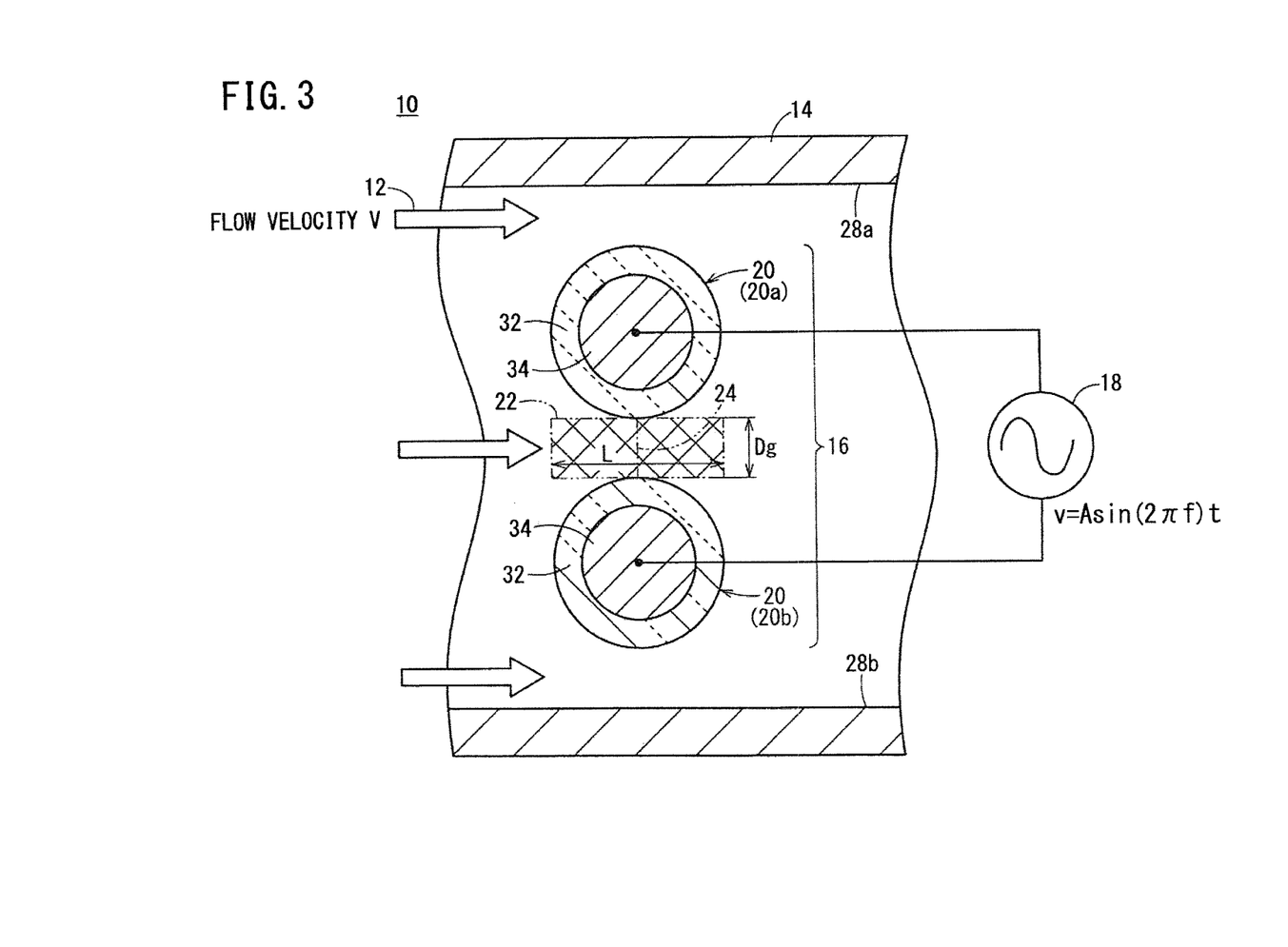
FIG. 3 is an explanatory view for specifically illustrating the flow velocity V (m/s) of a source gas flowing through a discharge space, the frequency f (Hz) of an alternating-current voltage v, and the length L (m) of the discharge space in the main flow direction of the source gas in the principal part of the ozone generator of the present embodiment.

As shown in FIG. 3, the ozone generator 10 of the above embodiment preferably satisfies the following inequality (1) where V (m/s) represents the flow velocity of the source gas 12 flowing through the discharge space 22, f (Hz) represents the frequency of the alternating-current voltage v, and L (m) represents the length of the discharge space 22 in the main flow direction of the source gas 12.

$$0.5 < V/f/L \tag{1}$$

The value of V/f/L indicates how many times as long the movement distance of the source gas 12 per period of the alternating-current voltage is as the length L.

When the ozone generator 10 satisfies the inequality (1), the ozone molecules produced by the discharge are hardly exposed to the discharge again. Therefore, the ozone molecules are hardly decomposed via a reaction with an O atom, a water molecule, or an OH group. Thus, the ozone production amount reduction can be prevented.

When the ozone generator 10 satisfies the following inequality (2), a smaller amount of the produced ozone molecules are exposed to the discharge again, as compared with the inequality (1). Therefore, the ozone molecules are hardly decomposed via a reaction with the O atom, the water molecule, or the OH group. Thus, the ozone production amount reduction can be further prevented.

$$1 < V/f/L \tag{2}$$

When the ozone generator 10 satisfies the following inequality (3), the amount of the unreacted source gas 12 can be reduced, so that the ozone production amount reduction can be prevented.

$$50 > V/f/L \tag{3}$$

When the ozone generator 10 satisfies the following inequality (4), the residual amount of the unreacted source gas 12 can be further reduced, so that the ozone production amount reduction can be further prevented.

$$20 > V/f/L \tag{4}$$

In the ozone generator 10 of this embodiment, the flow rate of the source gas 12 flowing through the discharge space 22 is preferably 380 L/min or less. The flow rate is more preferably 300 L/min or less, further preferably 150 L/min or less.

In this case, the distribution of the source gas 12 can be narrowed in the discharge space 22, the ozone molecules can be uniformly produced in the discharge space 22, and the source gas 12 can be used up for the ozone production. Therefore, the ozone production amount reduction due to the ozone decomposition can be prevented, and the amount of the unreacted source gas 12 flowing through the discharge space 22, can be reduced. Consequently, the ozone generator 10 can exhibit a high ozone production efficiency.

As shown in FIG. 1, the upper limit of the gap length Dg between the two electrodes 20 is preferably less than 1.0 mm. The gap length Dg denotes the shortest distance between the dielectric body 32 of the one electrode 20a and the dielectric body 32 of the other electrode 20b.

In this embodiment, each electrode 20 contains the tubular dielectric body 32 having the hollow portion 30 and the conductive body 34 disposed in the hollow portion 30.

Therefore, the distance between the electrodes 20 can be easily adjusted. Thus, the gap length Dg between the electrodes 20 can be easily reduced to less than 1.0 mm as compared with the creeping discharge-type structure disclosed in Japanese Laid-Open Patent Publication No. 10-324504.

Figure 4A:
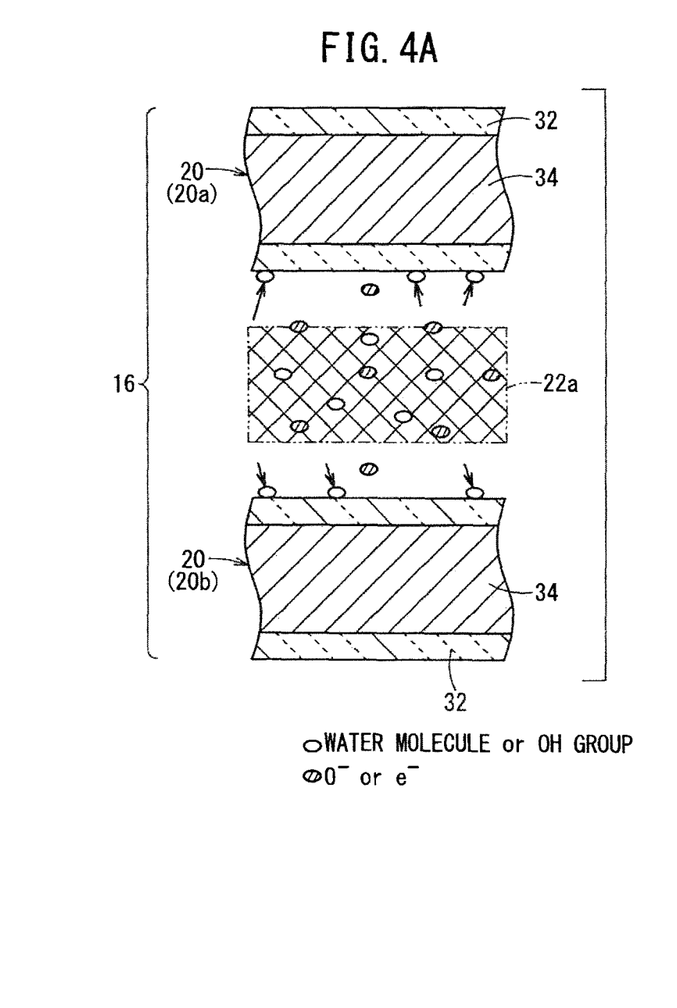
FIG. 4A is an explanatory view for illustrating a disadvantage of an ozone generator having an electrode pair with a larger gap length.

In a high-humidity environment, water molecules and OH groups may negatively affect the ozone production of the ozone generator 10. Therefore, it is preferable to adsorb as many water molecules and OH groups as possible to the dielectric bodies 32 of the electrodes 20. In this case, the amounts of the water molecules and the OH groups remaining in a central portion 22a of the discharge space 22 can be reduced to decrease the negative effect on the ozone production. However, when the gap length Dg is 1.0 mm or more as shown in FIG. 4A, the distance between the dielectric bodies 32 is increased, whereby a smaller amount of the water molecules and the OH groups are adsorbed to the dielectric bodies 32, and a larger amount of the water molecules and the OH groups remain around the dielectric bodies 32 or in the central portion 22a of the discharge space 22. Therefore, in the high-humidity environment, the ozone production is inhibited, the ozone production efficiency is reduced, or the ozone production is stopped, by the increased water molecules and OH groups which are contained in the source gas 12 and remain around the dielectric bodies 32 or in the central portion 22a of the discharge space 22.

Figure 4B:
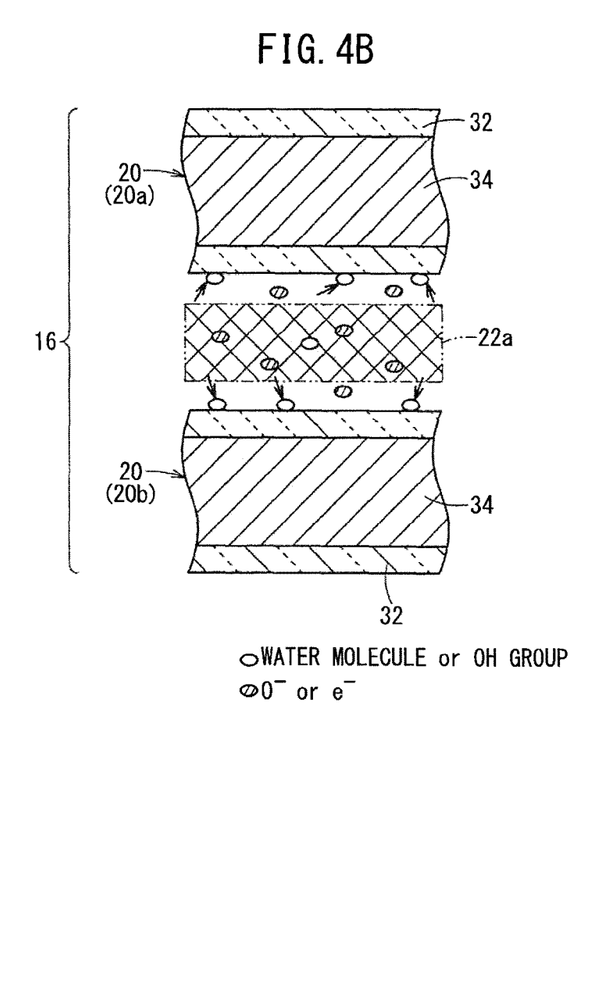
FIG. 4B is explanatory view for illustrating an advantageous effect of the ozone generator of the present embodiment.

In contrast, in this embodiment, the upper limit of the gap length Dg is less than 1.0 mm. Therefore, as shown in FIG. 4B, even in the high-humidity environment, the water molecules and the OH groups, which may negatively affect the ozone production, are mostly adsorbed to the surfaces of the dielectric bodies 32, and the amounts of the water molecules and the OH groups remaining around the dielectric bodies 32 and in the central portion 22a of the discharge space 22 are reduced. Consequently, the ozone production inhibition can be prevented, and the ozone production amount reduction can be prevented. Furthermore, an area in which the water molecules and the OH groups remain around the dielectric bodies 32 and in the central portion 22a of the discharge space 22, can be narrowed. Thus, an area in which the ozone production is inhibited, can be narrowed, and the ozone production amount reduction can be prevented.

As a result, the ozone production performance is changed only slightly even under a high humidity, and therefore the ozone generator 10 can act to stably produce ozone in a wide range of humidity environments (with an absolute humidity of 0 to 50 g/m$^3$).

The upper limit of the gap length Dg is further preferably 0.5 mm or less. In this case, a further larger amount of the water molecules and the OH groups, which may inhibit the ozone production, can be adsorbed to the dielectric bodies 32, whereas the water molecules and the OH groups remaining around the dielectric bodies 32 and in the central portion 22a of the discharge space 22 can be accordingly further reduced. Therefore, the ozone production amount reduction can be further prevented.

On the other hand, when the gap length Dg is excessively reduced, the discharge space 22 may be short-circuited by the water molecules and the OH groups adsorbed to the dielectric bodies 32. More specifically, the dielectric bodies 32 may be connected to each other by the water molecules and the OH groups. This case is similar to the situation where a larger amount of the water molecules and the OH groups remain in the central portion 22a of the discharge space 22. Thus, by the presence of water molecules and OH groups, the ozone production is inhibited, the ozone production efficiency is reduced, or the ozone production is stopped. The lower limit of the gap length Dg is preferably 0.1 mm or more, further preferably 0.2 mm or more. In this case, the short circuit of the discharge space 22 due to the water molecules and the OH groups can be prevented to suppress the ozone production amount reduction.

The electrode 20 may be produced by the following method. Thus, for example, a tubular compact (or green body) is preliminarily fired to prepare a preliminarily fired body having a hollow portion, and thereafter the conductive body 34 is inserted into the hollow portion of the preliminarily fired body. Then, the preliminarily fired body and the conductive body 34 are fired at a temperature higher than the preliminary firing temperature to produce the electrode 20 containing the dielectric body 32 and the conductive body 34 directly integrated with each other, the conductive body 34 being inserted into the hollow portion 30 of the dielectric body 32.

Alternatively, the electrode 20 may be produced by a gel casting method. In the gel casting method, the conductive body 34 is placed in a mold, a slurry containing a ceramic powder, a dispersion medium, and a gelling agent is cast into the mold, the slurry is gelled under a temperature condition or by adding a cross-linker, whereby the slurry is solidified and molded, and the resultant is fired to produce the electrode 20.

Figure 5:
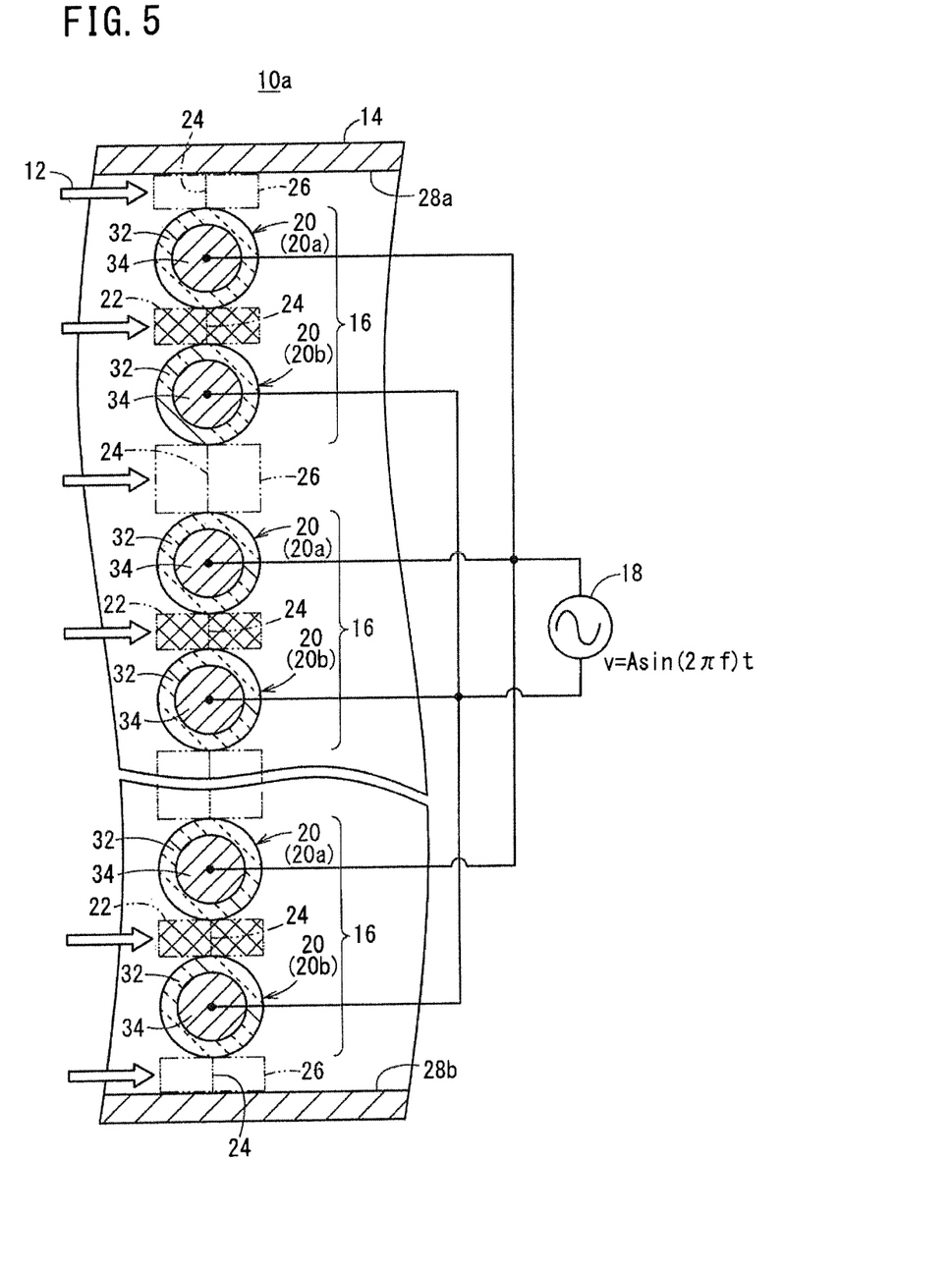
FIG. 5 is a longitudinal cross-sectional view of a principal part of an ozone generator according to a first modification example.
Figure 6:
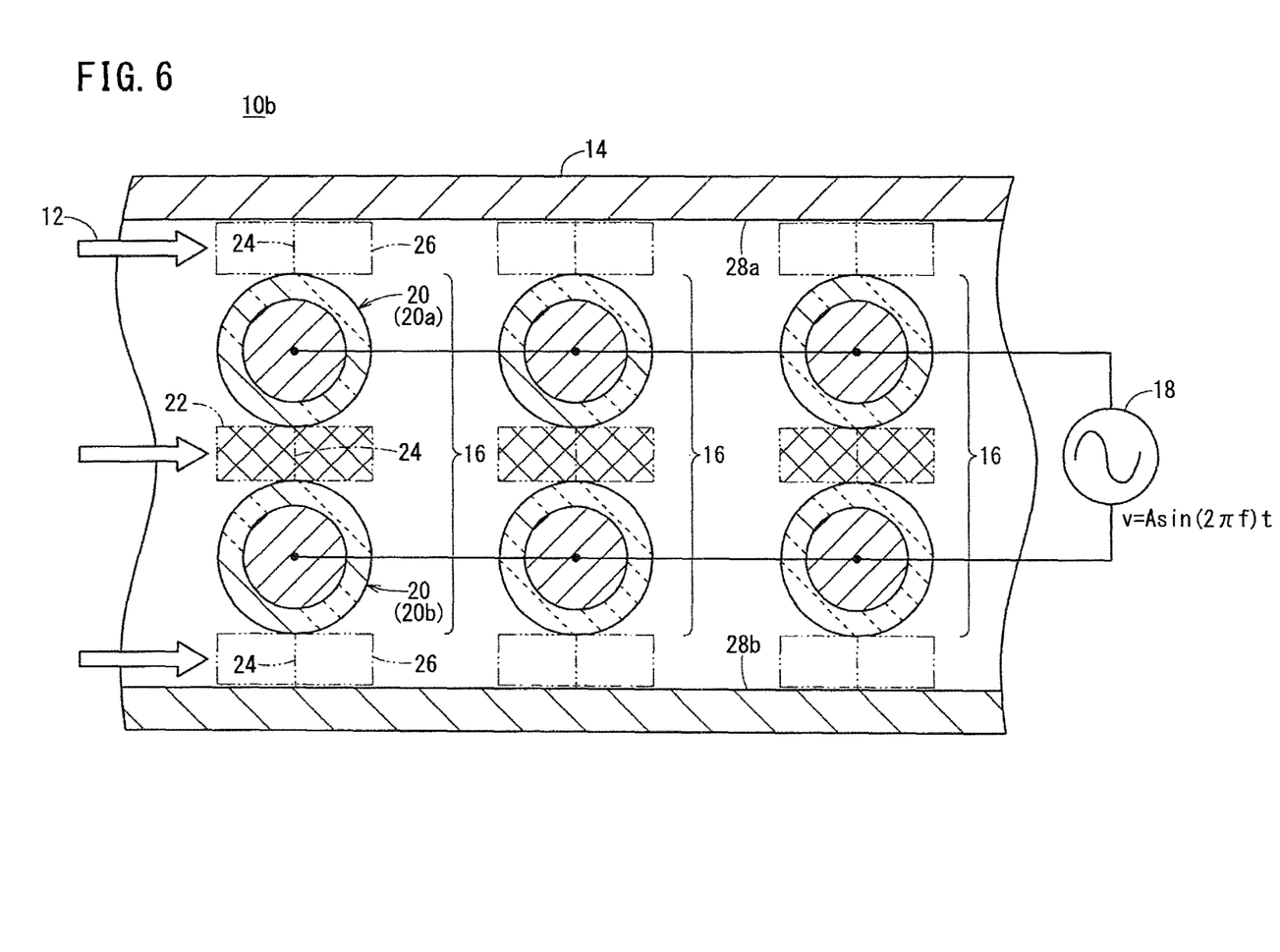
FIG. 6 is a longitudinal cross-sectional view of a principal part of an ozone generator according to a second modification example.
Figure 7:
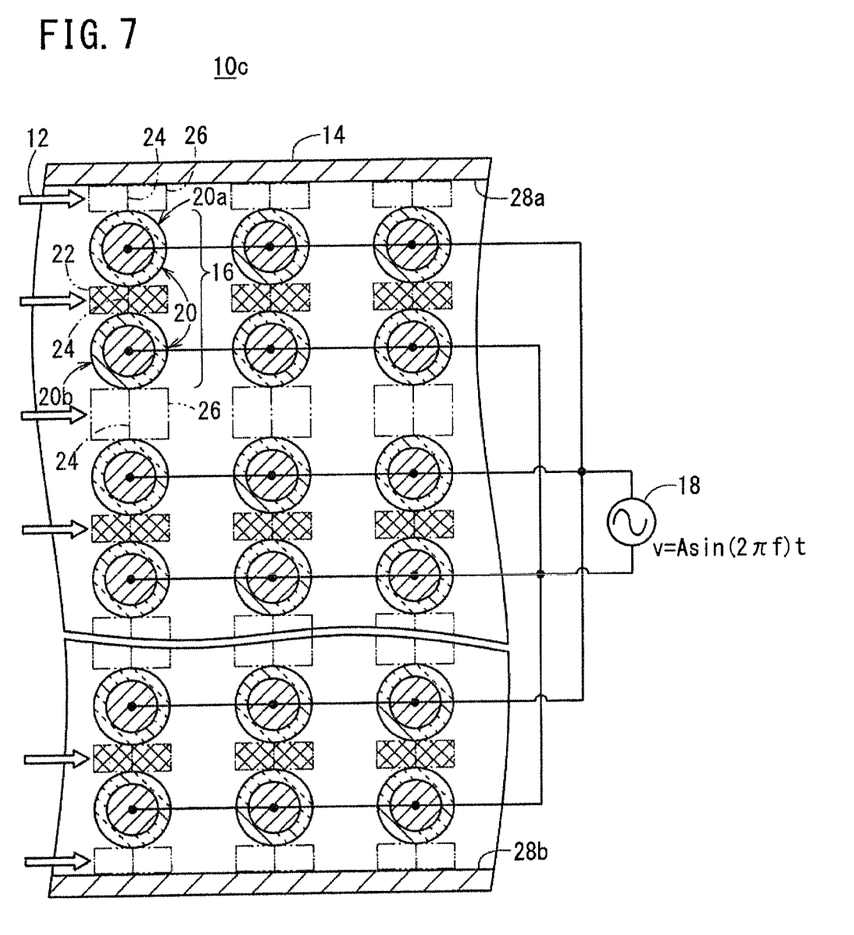
FIG. 7 is a longitudinal cross-sectional view of a principal part of an ozone generator according to a third modification example.

Though one electrode pair 16 is described in the above example, also structures according to first to third modification examples shown in FIGS. 5 to 7 can be preferably used in the present invention.

As shown in FIG. 5, an ozone generator 10a according to the first modification example is different from the ozone generator 10 (shown in FIGS. 1 and 2) in that a plurality of the electrode pairs 16 are arranged in parallel. The alternating-current power source 18 acts to apply the alternating-current voltage v between the one electrode 20a and the other electrode 20b in each of the electrode pairs 16.

Also the ozone generator 10a has the non-discharge spaces 26 on the gas passage plane 24. Specifically, the non-discharge spaces 26 include spaces between the electrode pairs 16, a space between the one electrode 20a (adjacent to the one inner wall 28a of the housing 14) and the one inner wall 28a, and a space between the other electrode 20b (adjacent to the other inner wall 28b of the housing 14) and the other inner wall 28b on the gas passage plane 24.

As shown in FIG. 6, an ozone generator 10b according to the second modification example is different from the ozone generator 10 (shown in FIGS. 1 and 2) in that a plurality of the electrode pairs 16 are arranged in series. The alternating-current power source 18 acts to apply the alternating-current voltage v between the one electrode 20a and the other electrode 20b in each of the electrode pairs 16.

Also the ozone generator 10b has the non-discharge spaces 26 on the gas passage planes 24. Specifically, the non-discharge spaces 26 include a space between the one electrode 20a in each of the electrode pairs 16 and the one inner wall 28a of the housing 14, and a space between the other electrode 20b in each of the electrode pairs 16 and the other inner wall 28b of the housing 14.

As shown in FIG. 7, an ozone generator 10c according to the third modification example is different from the ozone generator 10 (shown in FIGS. 1 and 2) in that a plurality of the electrode pairs 16 are arranged in parallel and series. The alternating-current power source 18 acts to apply the alternating-current voltage v between the one electrode 20a and the other electrode 20b in each of the electrode pairs 16.

Also the ozone generator 10c has the non-discharge spaces 26 on the gas passage planes 24.

First Example

Ozone concentration changes with changing V/f/L value were evaluated in samples 1 to 3 using respective different flow rates of the source gas 12.

An air was used as the source gas 12. The alternating-current power source 18 was used as a discharge power source for applying the alternating-current voltage v with a voltage (amplitude A) of ±4 kV and a frequency f of 20 kHz.

Under the above conditions, the ozone concentration of the exhaust gas was measured using an ozone concentration meter EG-3000D (available from Ebara Jitsugyo Co., Ltd.).

As shown in FIG. 3, L represents the length (m) of the discharge space 22 in the main flow direction of the source gas 12, V represents the flow velocity (m/s) of the source gas 12 flowing through the discharge space 22, and f represents the frequency (Hz) of the alternating-current voltage v from the alternating-current power source 18.

The details of the samples 1 to 3 were as follows.

Sample 1

The sample 1 had the structure shown in FIGS. 1 to 3 with the gap length Dg of 0.30 mm in the electrode pair 16, and the source gas 12 was supplied thereto under a flow rate of 350 L/min.

Sample 2

The sample 2 had the same structure as the sample 1 except that the source gas 12 was supplied thereto under a flow rate of 275 L/min.

Sample 3

The sample 3 had the same structure as the sample 1 except that the source gas 12 was supplied thereto under a flow rate of 145 L/min.

Evaluation Result

Figure 8:
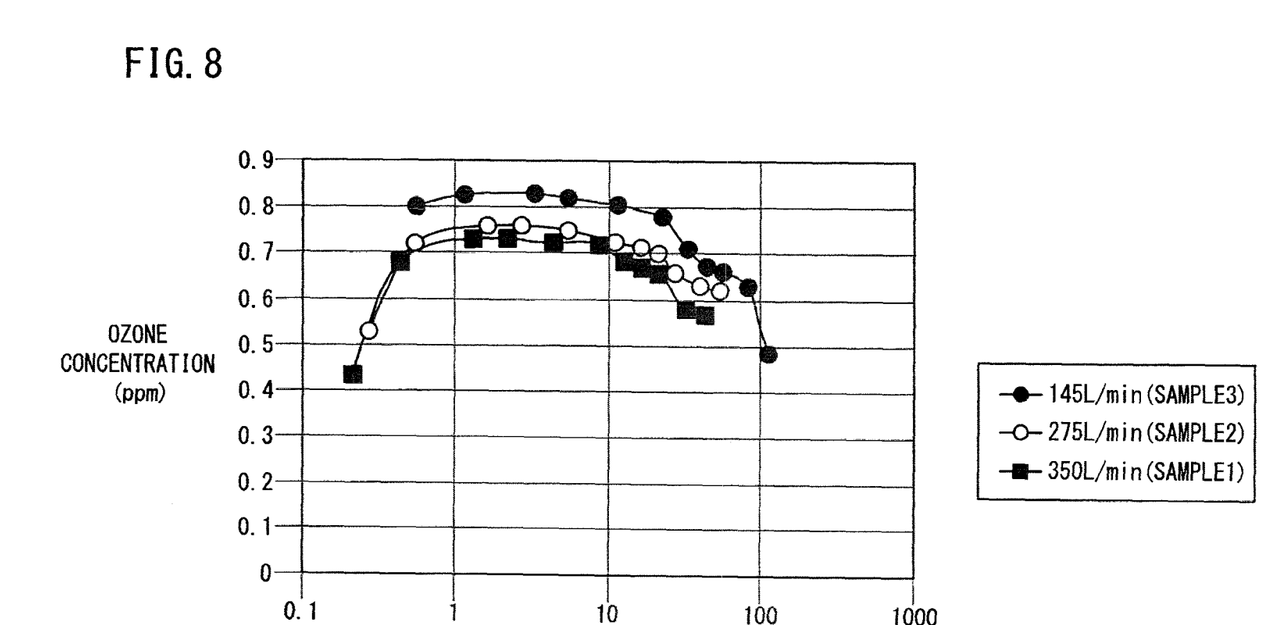
FIG. 8 is a graph showing the ozone concentration changes with changing V/f/L value in samples 1 to 3 using different source gas flow rates.

The evaluation results of the samples 1 to 3 are shown in FIG. 8. In FIG. 8, the horizontal axis of the graph representing V/f/L has a logarithmic scale.

As is clear from FIG. 8, in the sample 1, the ozone concentration of 0.7 ppm or more was maintained within the range of $0.5<V/f/L\leq10$, and the ozone concentration of about 0.72 ppm was maintained within the range of $1<V/f/L<10$. Furthermore, the ozone concentration of 0.6 to 0.7 ppm was maintained within the range of $10<V/f/L\leq30$, and the ozone concentration of 0.55 to 0.6 ppm was maintained within the range of $30<V/f/L<50$.

In the sample 2, the ozone concentration of 0.7 ppm or more was maintained within the range of $0.5<V/f/L\leq20$, and the ozone concentration of about 0.75 ppm was maintained within the range of $1<V/f/L<10$. Furthermore, the ozone concentration of 0.6 to 0.7 ppm was maintained within the range of $20<V/f/L<50$.

In the sample 3, the ozone concentration of 0.8 ppm or more was maintained within the range of $0.5<V/f/L\leq10$, and the ozone concentration of about 0.82 ppm was maintained within the range of $1<V/f/L<10$. Furthermore, the ozone concentration of 0.7 to 0.8 ppm was maintained within the range of $10<V/f/L\leq35$, and the ozone concentration of 0.65 to 0.7 ppm was maintained within the range of $35<V/f/L<50$.

Consequently, it is clear that the ozone generator preferably satisfies the condition of $0.5<V/f/L$, and further preferably satisfies the condition of $1<V/f/L$. When the ozone generator satisfies these conditions, the ozone molecules produced by the discharge are hardly exposed to the discharge again. Therefore, the ozone molecules are hardly decomposed via a reaction with an O atom, a water molecule, or an OH group under the re-discharge. Consequently, the ozone production amount reduction can be prevented.

In addition, it is clear that the ozone generator preferably satisfies the condition of $50>V/f/L$, and further preferably satisfies the condition of $20>V/f/L$. When the ozone generator satisfies these conditions, the amount of the unreacted source gas 12 can be reduced, so that the ozone production amount reduction can be prevented.

Furthermore, as is clear from the results of the samples 1 to 0.3, the flow rate of the source gas 12 flowing through the discharge space 22 is preferably 380 L/min or less. The flow rate is more preferably 300 L/min or less, further preferably 150 L/min or less. When the ozone generator satisfies these conditions, the distribution of the source gas 12 can be narrowed in the discharge space 22, the ozone molecules can be uniformly produced in the discharge space 22, and the source gas 12 can be used up for the ozone production. Therefore, the amount of the residual source gas 12 that has flowed through the discharge space 22 without the production reaction, can be reduced. Consequently, the ozone generator can exhibit a high ozone production efficiency.

Second Example

Ozone production efficiency changes with absolute humidity were evaluated in samples 11 to 16. The ozone production efficiency corresponds to the ozone concentration of an exhaust gas under a constant applied electric power and a constant gas flow rate.

Method for Measuring Ozone Production Efficiency

In the measurement of the ozone production efficiency, an air was used as the source gas 12 under a gag flow rate of 350 L/min and a gas pressure of 0.10 MPa.

As in the first embodiment, the alternating-current power source 18 was used as a discharge power source for applying the alternating-current voltage v with a voltage (amplitude A) of ±4 kV and a frequency f of 20 kHz.

Under the above conditions, the ozone concentration of the exhaust gas was measured using an ozone concentration meter EG-3000D (available from Ebara Jitsugyo Co., Ltd.).

The details of electrode structures in ozone generators of the samples 11 to 16 were as follows.

Sample 11

The sample 11 had the structure shown in FIGS. 1 and 2 with the gap length Dg of 0.60 mm in the electrode pair 16.

Samples 12 to 15

The samples 12, 13, 14, and 15 had the same structure as the sample 11 except that the gap lengths Dg were 0.45, 0.30, 0.15, and 0.05 mm in the electrode pairs 16 respectively.

Sample 16

The sample 16 had the same structure as the sample 11 except that the gap length Dg was 1.00 mm in the electrode pair 16.

Evaluation Result

Figure 9:
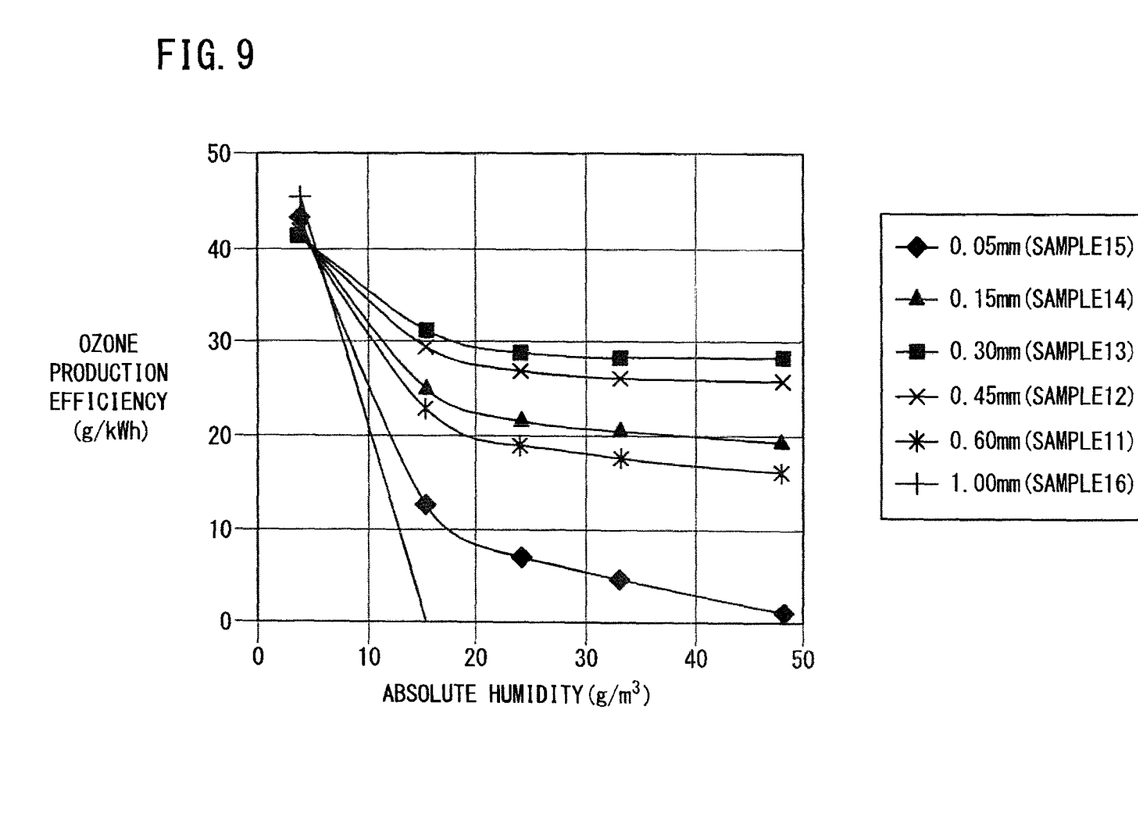
FIG. 9 is a graph showing the ozone production efficiency changes with absolute humidity in samples 11 to 16.

The evaluation results of the samples 11 to 16 are shown in FIG. 9.

As is clear from FIG. 9, in the sample 16, ozone was produced within the absolute humidity range of 0 to 15 $g/m^3$.

In contrast, in the samples 11 to 15, ozone was produced within the absolute humidity range of 0 to 50 $g/m^3$. In the samples 12 to 14, the ozone production efficiencies of 15 g/kWh or more were maintained within the absolute humidity range of 0 to 50 $g/m^3$, and thus the ozone production processes were stably performed in a wide range of humidity environments. Particularly in the samples 12 and 13, the ozone production efficiencies of 25 g/kWh or more were maintained within the absolute humidity range of 0 to 50 g/m³.

Consequently, it is clear that the upper limit of the gap length Dg in the electrode pair 16 is preferably less than 1.0 mm, further preferably 0.5 mm or less. In addition, it is clear that the lower limit of the gap length Dg is preferably 0.1 mm or more, further preferably 0.2 mm or more.

It is to be understood that the ozone generator of the present invention is not limited to the above embodiment, and various changes and modifications may be made therein without departing from the scope of the invention.

The invention claimed is:

1. A method for generating ozone, comprising:
   flowing at least a portion of a source gas at least through a discharge space between a first electrode and a second electrode; and
   applying an alternating-current voltage between the first electrode and the second electrode,
   a value of V/f/L is greater than 0.5, wherein V (m/s) represents a flow velocity of the source gas flowing through the discharge space, f (Hz) represents a frequency of the alternating-current voltage, and L (m) represents a length of the discharge space in a main flow direction of the source gas.

2. A method as recited in claim 1, wherein the value of V/f/L is greater than 1.

3. A method as recited in claim 1, wherein the value of V/f/L is less than 50.

4. A method as recited in claim 1, wherein the value of V/f/L is less than 20.

5. A method as recited in claim 1, wherein the first and second electrodes are arranged at a gap length of a distance which is at least 0.2 mm and not greater than 0.5 mm.

6. A method as recited in claim 1, wherein the source gas is an atmospheric air.

7. A method as recited in claim 1, wherein each of the first and second electrodes comprises a tubular dielectric body having a hollow portion and a conductive body disposed in the hollow portion.

8. A method as recited in claim 1, wherein:
   the method comprises flowing the source gas through a plurality of pairs of electrodes arranged in parallel, in series, or in parallel and series, and
   some of the source gas passes through a non-discharge space on a gas passage plane, the gas passage plane having a normal direction parallel to the main flow direction of the source gas.

9. A method as recited in claim 1, wherein a flow rate of the source gas flowing through the discharge space is 380 L/min or less.

10. A method as recited in claim 5, wherein each of the first and second electrodes comprises a tubular dielectric body having a hollow portion and a conductive body disposed in the hollow portion.

11. A method as recited in claim 10, wherein the dielectric body of the first electrode faces the dielectric body of the second electrode.

12. A method as recited in claim 1, wherein each of the first and second electrodes comprises a conductive body and a dielectric body that covers an entire periphery of the conductive body.

13. A method as recited in claim 1, wherein the first and second electrodes are arranged at a gap length of a distance which is less than 1.0 mm.

14. A method as recited in claim 1, wherein the source gas has an absolute humidity in the range of from 0 g/m³ to about 50 g/m³.

* * * * *